T. P. PAYNE.
MACHINE FOR MAKING DISTANCE RECORD DEVICES FOR METAL WORKING MACHINES.
APPLICATION FILED AUG. 10, 1916.

1,241,268.

Patented Sept. 25, 1917.
3 SHEETS—SHEET 2.

WITNESSES
L. Loehr
J. Armstrong

INVENTOR
T. P. Payne
BY John D. Morgan
ATTORNEYS

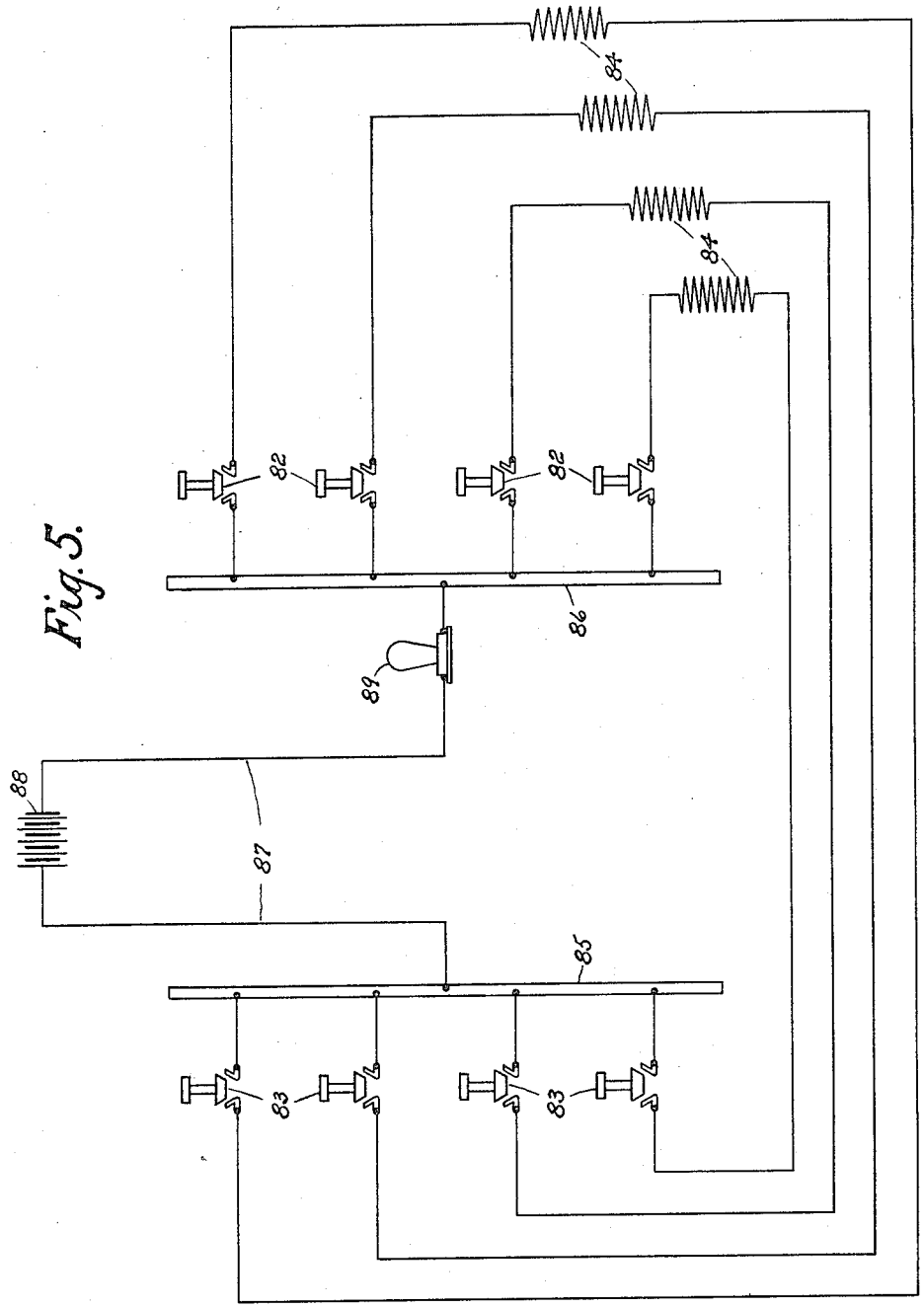

UNITED STATES PATENT OFFICE.

THEODORE P. PAYNE, OF NEWARK, NEW JERSEY, ASSIGNOR TO STEEL UTILITIES, INCORPORATED, A CORPORATION OF NEW YORK.

MACHINE FOR MAKING DISTANCE-RECORD DEVICES FOR METAL-WORKING MACHINES.

1,241,268.        Specification of Letters Patent.        Patented Sept. 25, 1917.

Original application filed March 2, 1914, Serial No. 821,990. Divided and this application filed August 10, 1916. Serial No. 114,113.

*To all whom it may concern:*

Be it known that I, THEODORE P. PAYNE, a citizen of the United States, and a resident of Newark, N. J., have invented new and useful Improvements in Machines for Making Distance-Record Devices for Metal-Working Machines, of which the following is a specification.

The invention relates to machines for making distance record devices for metal working machines and more particularly to machines for making an automatically operating distance record device, such as a strip or sheet, which constitutes a permanent distance record device and is adapted to automatically control the travel and stopping of the shape or like work through the machine and relatively to the punching mechanism.

Objects of the invention are to produce a distance record device for automatically controlling a shape punching machine; to provide for making such distance record device in the form of a perforated sheet or strip; to provide against the making of errors in making the distance records, and more particularly to prevent the making of erroneous perforations in such a sheet or strip; to provide for making a record of the distances or dimensions recorded or perforated in the sheet or strip or like record device; to provide for making such a printed record; to provide for recording the total dimensional or distance values of the successive settings for a particular shape or other piece of work; to provide more especially for making such total record in printed form; to provide selective devices for setting the desired distance and to provide error preventing means in coöperation therewith; to provide such selective means in duplicate, each such means being operated independently by a different person, and identical settings thereof being prerequisite to making a record in the distance record device, such as the perforations in the sheet or strip; to provide a novel mechanism for effecting the various enumerated functions and objects. These and other objects of the invention will be set forth hereinafter in part, and in part will be obvious to those skilled in the art.

The invention consists in the novel parts, constructions, arrangements, combinations and improvements herein shown and described.

The accompanying drawings referred to herein, and forming a part hereof, illustrate one embodiment of the invention, and with the description, serve to explain the principles thereof.

Of the drawings:—

Fig. 5 is a wiring diagram.

Referring by way of example to the accompanying drawings, which illustrate one embodiment of the invention, means are provided for selectively setting the punches, or other means for making the distance indications, preliminary to the actual making of such indications, and in accordance with certain features of the invention in connection with such setting there is made a record, preferably a printed numerical record of such settings. Further, in accordance with certain aspects of the invention, and as embodied, in combination and coöperation with the foregoing, means are provided whereby the operator may at will cause the set indications, or setting for the indications, to be perforated or otherwise marked in the sheet or strip or other distance record device at a time subsequent to the setting. Further, in accordance with certain features of the invention, and to prevent erroneous perforations of other records to be made, duplicate setting devices, operable independently by different operators are provided, and as embodied same are shown in combination and coöperation with the other means and instrumentalities referred to.

Figure 1:
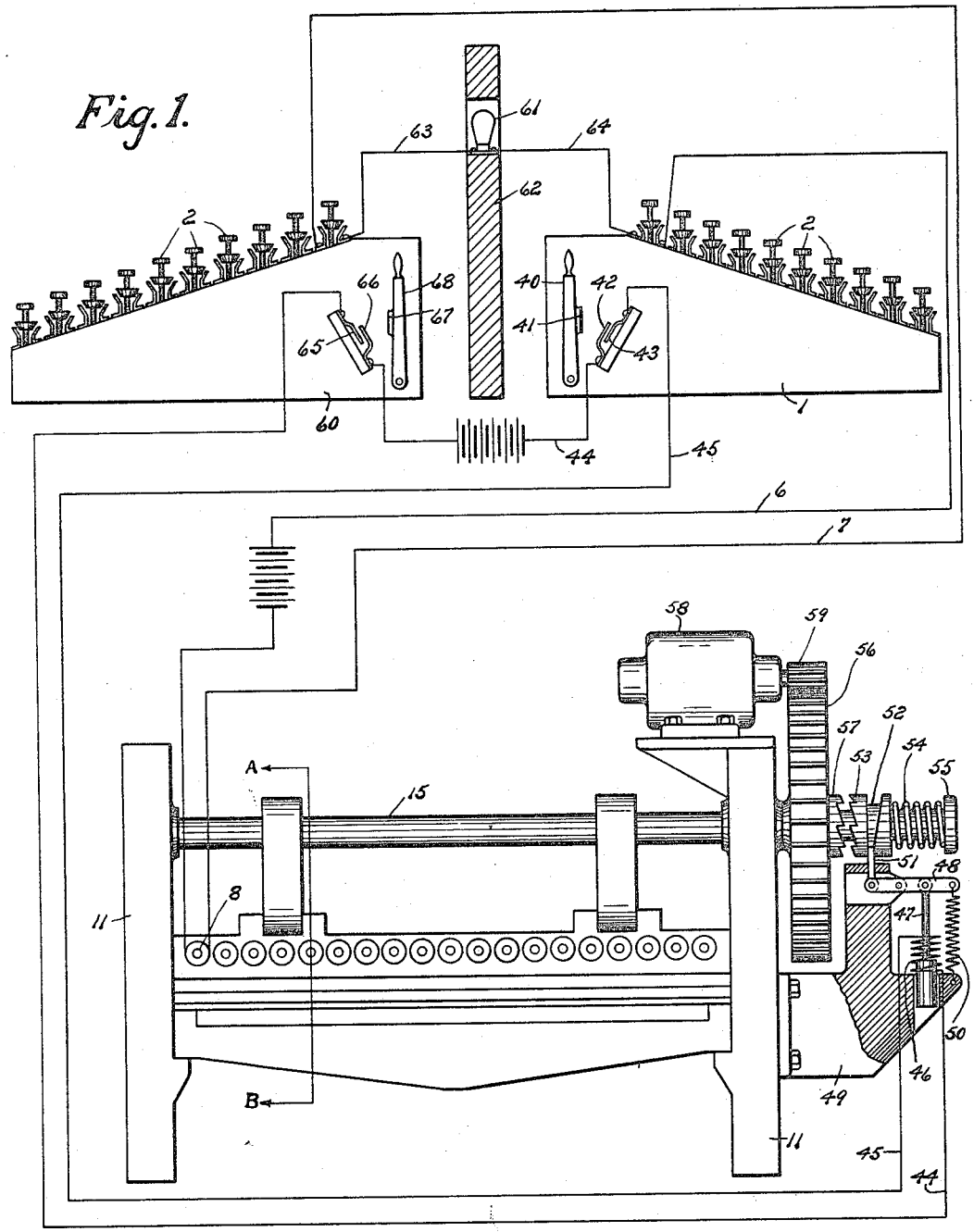
Figure 1 is an elevation, partly diagrammatic, of a machine embodying the invention.

Referring more particularly to Fig. 1, and to the selective or settable devices which control the making of the distance indications, the present embodiment comprises a calculating machine of the type or kind constructed and arranged to record distances and to add successive records of distances together. Commercial types of such machines are instanced by the "Wales" or "Burroughs" machine of this kind, which print and add feet and inches and fractions thereof. Such a machine is indicated by reference numeral 1.

Figure 2:
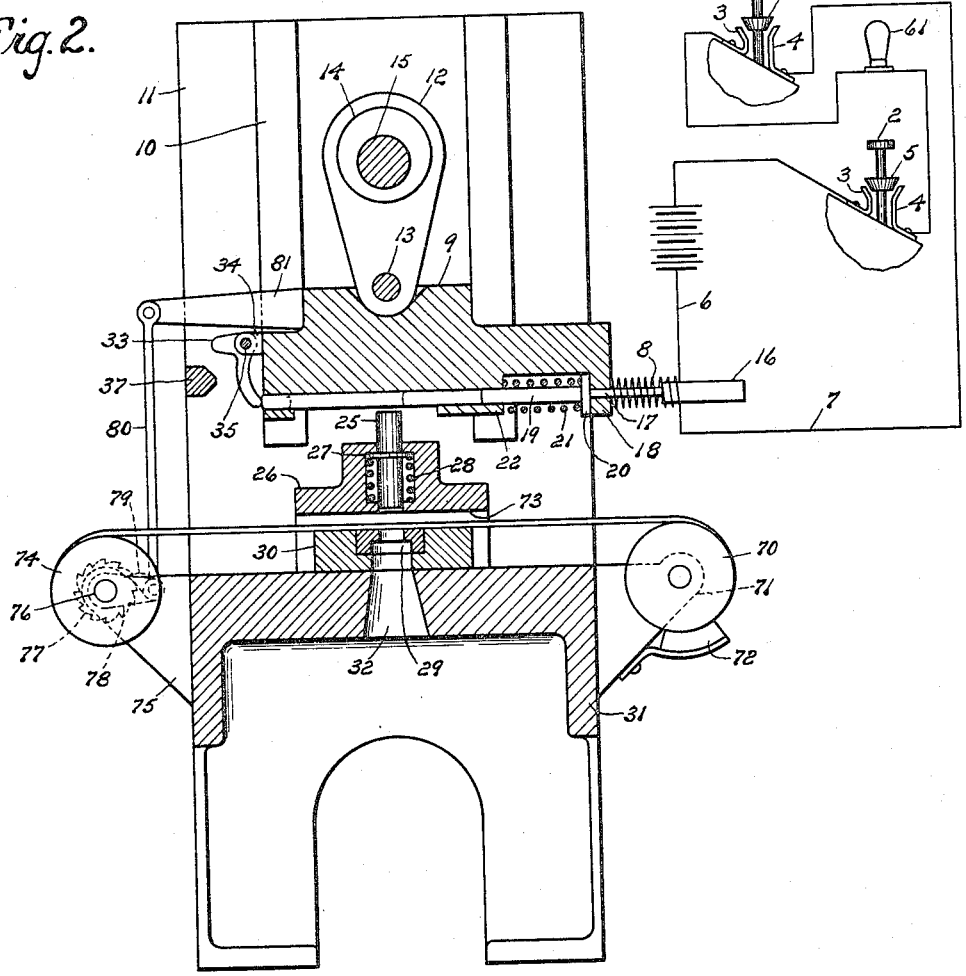
Fig. 2 is a section, on an enlarged scale, on the line A—B of Fig. 1 looking in the direction of the arrows.

The embodied form of device for making the distance indications comprises means for making perforations in a sheet or strip at various selected points in a line transversely of the sheet or strip, said line being either straight or staggered, and the position of a perforation transversely of the line being significant in the punching machine of a particular denomination and a particular numerical value in such distance denomination. As embodied, the series of keys 2 of the calculating machine 1, which keys represent the various distance values, are provided with contacts or terminals 3 and 4 adjacent thereto, which contacts or terminals are in an electrical circuit which controls the setting of gags or interponents in the punching machine. On the stem of each of the keys 2 is a bridgepiece 5, adapted to close the gap between the contacts 3 and 4. In circuit with the contacts 3 and 4 for each key by means of wires 6 and 7 (shown diagrammatically in both Figs. 1 and 2), is a solenoid 8. But one of said circuits is shown in the drawings, the others being of like arrangement.

The series of solenoids 8 are mounted on a reciprocating head 9, which head reciprocates on guideways 10 in a frame 11. Said head 9 is reciprocated by suitable means, such as links 12 pivotally connected at 13 to the head 9 and supported from eccentrics 14 carried upon a shaft 15 journaled in the frame 11. The head 9 is relatively long and carries the solenoids 8 in a row corresponding to the number of punches located transversely of the strip as it is fed through the machine.

The core 16 of each solenoid 8 has connected thereto a rod 17 reciprocable in a suitable aperture in a flange 18 fixed to or integral with the head 9. In alinement with each of the pins 17 a guideway is formed through the head 9, in which guideway a gag or interponent is slidable. Said gag or interponent comprises a part 19 provided with a head 20, which abuts upon the end of the rod 17, said part 19 being surrounded by a spring 21 in compression between the head 20 and a suitable surface 22 formed in the head 9, said spring being for the purpose of restoring the part 19 of the gag or interponent after it has been set.

The gag or interponent comprises also a slide or bar 23 separate from the part 19. Said part 23 is provided with a slot 24 formed internally thereof and open vertically therethrough.

A series of punches 25 corresponding to the keys 2, are arranged adjacent to and beneath the series of interponents or gags, said punches being in the form of rods mounted reciprocably in apertures in a block 26. The central parts of said apertures in the block 26 are enlarged, and in such enlarged portions, the punches 25 have thereon collars 27, restoring springs 28 encircling said punches 25, said springs being in compression between said collars 27 and the bottoms of the apertures. Beneath each punch 25 is a suitable die 29 mounted in a block 30 carried upon a support or table 31. An opening 32 permits the cut-out portion of the sheet to fall away therethrough.

Mounted upon the head 9 are a series of bent levers 33, conveniently carried upon a rod 35 which rod is mounted in brackets 34 on the head 9. The lowermost end of each lever 33 is in alinement with the left hand end (referred to in Fig. 2) of the member 23 of the corresponding gag or interponent. The other end of each bent lever 33 projects outwardly so as to contact in passing with a bar 37 carried by the frame of the machine, the surface of the bar 37 acting as a cam for the levers 33.

The head 9 is reciprocated upon the completion of each particular distance setting, and in the embodied mechanism the recording of the setting in the calculating machine 1 and the recording of the setting in the distance record device, by making the perforations in the strip, are effected simultaneously. The lever 40 of the calculating machine is the usual lever actuated to imprint or record within the machine the setting which has just been made. Upon the lever 40 is a contact or bridge piece 41 adapted to close the circuit between the terminals 42 and 43 connected respectively to the circuit wires 44 and 45, and operating mechanism for throwing in and out a clutch for shaft 15. The wires 44 and 45 are in circuit with a solenoid 46, the core 47 of said solenoid being pivotally connected to a lever 48, which lever is pivoted upon a bracket 49 carried by the frame 11. Said lever 48 is acted upon by a spring 50 normally acting to decenter the core 47 in the solenoid 46. Pivotally connected to the other end of the lever 48 is a pin 51 reciprocable in an aperture in the bracket 49. The other end of pin 51 works in a cam groove 52 in the clutch member 53. Said clutch member 53 is splined upon the shaft 15 and is urged to the left (referred to Fig. 1) by a spring 54 encircling the shaft 15, and acting between the clutch member 53 and a collar 55 fixed upon the shaft 15. Loose upon the shaft 15 is a gear 56 having fixed thereto the other clutch member 57 adapted to coöperate with the clutch member 53. A suitable drive is provided for the gear 56, such as a pinion 59, driven by a motor 58.

In accordance with certain features of the invention, as previously indicated, the selective devices are provided in duplicate, identical settings upon each device, said settings being independently made by two different operators being essential to making a record in the distance record device. As embodied, a second calculating machine 60 is provided, the keys thereof being connected in series with the corresponding keys of the calculating machine 1.

It will be understood that so far as concerns certain features of the invention, the various circuit wires 44 and 45 would extend from the key board of machine 1 to the corresponding solenoids 8, and they have been so described hereinbefore. In connection with the feature of the invention about to be described such circuits are modified to take in both keyboards of machines 1 and 60 in series. So far as concerns certain aspects of the invention, the machine 1 could be used without a second machine 60 in connection with the sheet perforating mechanism. An indicating device for indicating an error or lack of identity in the settings of the two machines is also provided, and as embodied comprises a lamp 61. To insure each of the operators setting his machine independently of the other, so that one operator will not copy an error made by the other, but each will be compelled to work from his own blueprint schedule, or other source of measurements a screen or barrier 62 is interposed between the two keyboards, the lamp 61 being mounted in an opening in the screen 62.

Suitable connection or wiring is provided, but for the sake of clearness but a single circuit is shown in the drawings. The contacts 3 and 4 for each key are in series with the corresponding key in the other keyboard, the connecting wires 63 and 64 passing through the lamp 61. The wire 44 in the circuit for operating the clutch 53, 57 passes through the terminals 65 and 66. Said terminals 65 and 66 are connected by a contact piece 67 upon the recording or printing lever 68 of the calculating machine 60.

Means are provided for presenting a new portion of the distance record device to the distance indication recording means, and in the embodied form the strip or sheet is intermittently fed to the punching devices between successive operations of the punching means. In the embodied form of feeding means, a roll 70 of suitable material, such as a heavy paper, is supported upon a bracket 71 attached to the table 31. A braking device 72 may act upon the roll 70 to prevent a too free feed of the strip. The strip passes from roll 70 through the guideway 73 between the punches and dies and is rolled up on a roller 74, supported by a bracket 75 on the table 31. Fixed to the shaft 76 of the roll 74 is a ratchet wheel 77. Loosely mounted on the shaft 76 is a rocking arm 78 carrying a pawl 79. The end of the arm 78 is connected by a pivoted lever 80 to a bracket 81 carried upon the reciprocating head 9.

The manner of operation of the herein described mechanism is substantially as follows:

The operator of one of the calculating machines, say the machine 1, depresses or sets the keys corresponding to a given desired reading, and independently of him the operator of the machine 60 makes a corresponding setting upon that machine. Each operator is prevented by the screen 62 from noting the setting of the other machine, and each is compelled to work from his own blue print, schedule or other source of dimensions, or distance readings. When a correct setting in any particular denomination has been made by each operator, the lamp 61 will glow. If there is no glow of the lamp 61 at the completion of a setting, each operator knows that either he or the other operator has made an error in that particular denomination, and each operator is referred to his own source of dimension reading to verify his own setting.

Figure 3:
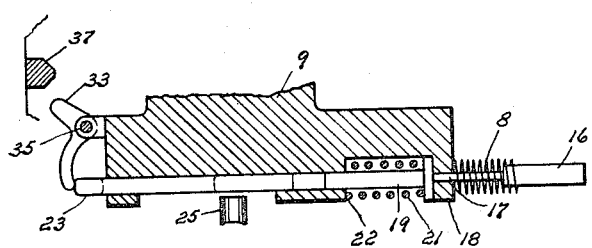
Fig. 3 is a fragmentary view, partly in section, of a punch gag or interponent and coöperating parts.
Figure 4:
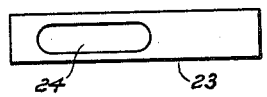
Fig. 4 is a plan of a portion of the gag shown in Figs. 2 and 3.

If no error has been made, or after such error has been corrected, the glowing of the lamp 61 indicates to each operator that he may operate the recording lever, namely the lever 40 upon the machine 1 and the lever 68, upon the machine 60. As soon as a correct setting in each dimension or distance denomination is made by each of the operators, the circuit is completed for each set key through the wires 6 and 7 to the corresponding solenoid 8. Upon the energizing of the solenoid 8 its core 16 is moved to the left (referred to Fig. 2). The two parts 19 and 23 of the gag or interponent corresponding to the solenoid are likewise moved to the left against the action of the spring 21. By such movement to the left the solid part of the member 23 is moved above the corresponding punch 25 (the slot 24 being above or in alinement with the corresponding punch 25 for all the unset keys of the keyboard). Thus when a key is depressed for the tens of feet, there will be a setting of the corresponding interponent member 23. Also when a key is depressed for the feet, the corresponding member 23 for the corresponding punch will likewise be set, and so on for inches and fractions of an inch. When the keys are restored or retracted, the circuits 6, 7 are deenergized with their corresponding solenoids 8, and the corresponding springs 21 decenter the solenoid cores 16 and carry the parts 19 of the gags or interponents to the right (referred to Fig. 3). The part 23 of each of the set interponents is left remaining in the "set" position, that is with its solid part in position to operate the corresponding punch 25 (see Fig. 3), the parts 23 being preferably friction tight in the slot or guideway in the head 9. After the punching has been effected, the parts 23 of the gags are restored to inoperative position as hereinafter described.

When the levers 40 and 68 are actuated by the operators of the respective machines 1 and 60 after the light 61 shows that the settings are correct, the circuit through the wires 44 and 45 is completed, and the solenoid 46 is energized, and the lever 48 is moved against its spring, and the pin 51 withdrawn from the slot or cam groove 52. The spring 54 causes the clutch members 53 and 57 to engage and the shaft 15 is turned over and a reciprocation imparted to the head 9. The circuit is immediately broken as the levers 40 and 68 are retracted and the spring 50 again projects the pin 51 into the cam slot 52 and clutch member 53 is cammed out of engagement with clutch member 57.

As the head 9 descends, the ends of the levers 33 engage the upper cam surface of the bar 37, but are merely idly rocked thereby, the head 9 passing downwardly and actuating the punches 25 for each of the selected or set interponents or gags. Thus perforations are made in the sheet positioned transversely of the sheet or strip to correspond to the denominations and to the numerical value of the selected or set keys 2 in the keyboards of the machines 1 and 60. As the head 9 recedes upwardly, the ends of the bent levers 33 contact with the lower cam surfaces on the bar 37 (see Fig. 3) and the set members 23 are moved backwardly from the position shown in Fig. 3 to that shown in Fig. 2, thus bringing their slots 24 above the corresponding punches 25 and rendering the particular gag or interponent inoperative until again set by its solenoid from the keyboard.

In Fig. 5 is shown a wiring diagram suitable for such a machine. The keys 82 may be regarded as having different numerical values in a given distance denomination, as for instance the inches on one of the calculating machines 1 or 60. The keys 83 may be regarded as the corresponding keys upon the other of said calculating machines. Solenoids 84 for the corresponding punches 25 are shown in series between the two keys of the same numerical value upon the two calculating machines 1 and 60. On the other side of the keys representing a denomination, there is provided on one of the machines a bus bar or common terminal 85, and a similar bus bar 86 for the other calculating machine. Between and connecting up to the bus bars 85 and 86 are circuit wires 87 in which are placed the battery 88, or other suitable source of power, and also the signal lamp 89 for this particular denomination. The lamp glows upon a correct setting being made, and the failure to get the glow being a signal that an error has occurred.

This application is a devision of my copending application Ser. No. 821,990 filed March 2, 1914.

From all the foregoing it will be understood that a machine has been provided embodying the principles of the invention and realizing the objects and advantages herein set forth together with other objects and advantages. It will also be understood that changes may be made from the mechanism herein shown and described, within the scope of the accompanying claims, without departing from the principles of the invention and without sacrificing its chief advantages.

What I claim as my invention and desire to secure by Letters Patent is:—

1. A machine for making distance record sheets for operating shape punching machines including in combination a plurality of means selectively settable to select a plurality of distance values, means for perforating said values in a distance record sheet and means for preventing the recording of non-identical settings of said settable means.

2. A machine for making distance record sheets for operating shape punching machines including in combination a plurality of means selectively settable to select a plurality of distance values, means for subsequently perforating said values in a distance record sheet and means for preventing the recording of non-identical settings of said settable means.

3. A machine for making distance record sheets for operating shape punching machines including in combination means selectively settable to select a plurality of distance values, means for perforating said values in a distance record device, and means for indicating a correct setting prior to its being perforated in said distance record device.

4. A machine for making distance record sheets for operating shape punching machines including in combination means for presenting and feeding the sheet to be perforated, a series of keys, a series of corresponding solenoids and circuits therefor controlled by the keys, a series of punches, a series of punch interponents set by the solenoids but disconnected therefrom to restore independently, means for actuating the set punches and means for subsequently restoring the interponents.

5. A machine for making distance record sheets for operating shape punching machines including in combination means for presenting and feeding the sheet to be perforated, a series of keys, a series of corresponding solenoids and circuits therefor controlled by the keys, a series of punches, a series of punch interponents set by the solenoids but restoring independently of the keys, means for actuating the set punches, a shaft for operating the punch actuating and the interponent restoring means, and means controlled by the operator for operating said shaft.

6. A machine for making distance record sheets for operating shape punching machines including in combination means for presenting and feeding the sheet to be perforated, a series of keys, a series of corresponding solenoids and circuits therefor controlled by the keys, a series of punches, a series of punch interponents set by the solenoids but restoring independently of the keys, means for actuating the set punches, a shaft for operating the punch actuating and the interponent restoring means, and a clutch for said shaft and a control therefor operated at the option of the operator.

7. A machine for making distance record sheets for operating shape punching machines including in combination a keyboard comprising circuit controlling keys representing distance values, circuits therefrom and solenoids in the circuits, means for presenting and feeding a sheet to be punched, a series of punches extending across said sheet, a series of loose interponents pushed into position by the solenoids for the actuated keys, punch actuating means including a shaft and a friction clutch therefor, a clutch release actuated at the will of the operator, and means for slidably returning the set interponents on the return movement of the punch actuating means.

8. A machine for making distance record sheets for operating shape punching machines including in combination intermittently acting strip or sheet feeding means, settable distance indicating means, solenoids in circuit with and controlled by said settable means, a series of punches corresponding to the distance indicating means, and a series of interponents for said punches operated by said solenoids, and means for simultaneously actuating a plurality of said punches after a plurality of interponents have been successively set, said sheet or strip feeding means operating intermittently between each successive operation of the punches.

9. A machine for making distance record sheets for operating shape punching machines including in combination, settable distance indicating means including a keyboard, a group of punches one for each key and arranged in a series transversely to the sheet to be punched, means for feeding the sheet always a uniform fixed distance between successive punchings, interponents one for each of said punches, each interponent being set by its corresponding key, and means operable at the will of the operator for simultaneously actuating a plurality of punches after a plurality of interponents have been successively set to make the perforations across the sheet for a distance reading.

10. A machine for making distance record sheets for operating shape punching machines including in combination a plurality of devices for marking a distance record sheet, a plurality of keyboards, and means for selecting said devices, said selecting devices being operable only by identical setting of said keyboards.

11. A machine for making distance record sheets for operating shape punching machines including in combination a plurality of devices for marking a distance record sheet, a plurality of keyboards, means for selecting said devices, said selecting devices being operable only by identical setting of said keyboard and means for indicating whether or not such identical setting has been made.

12. A machine for making distance record sheets for operating shape punching machines including in combination a plurality of punches, means for selectively setting said punches, a plurality of keyboards, said selectively settable devices being operable only by identical settings of said keyboards, and means for simultaneously operating a plurality of the selected punches.

13. A machine for making distance record sheets for operating shape punching machines including in combination a plurality of punches, means for selectively setting said punches, a plurality of keyboards, said selectively settable devices being operable only by identical settings of said keyboards, and means subsequently operable at the will of the operator for simultaneously operating a plurality of the selected punches.

14. A machine for making distance record sheets for operating shape punching machines including in combination, settable distance indicating means including a keyboard, a group of punches one for each key and arranged in a series transversely to the sheet to be punched, means for feeding the sheet always a uniform fixed distance between successive punchings, interponents one for each of said punches, each interponent being set by its corresponding key, and means operable at the will of the operator for simultaneously actuating a plurality of punches after a plurality of interponents have been successively set to make the perforations across the sheet for a distance reading, said actuating means including a traveling head engaging the interponents to cause the selected punches to perforate the strip.

In testimony whereof, I have signed my name to this specification, in the presence of two subscribing witnesses.

THEODORE P. PAYNE.

Witnesses:
JOHN D. MORGAN,
LOUISA LOEHR.